United States Patent Office 2,837,509
Patented June 3, 1958

2,837,509

THIOSEMICARBAZONE COMPOUNDS

Vincent C. Barry, Dublin, Ireland, assignor to Lasdon Foundation, Inc., Yonkers, N. Y., a corporation of New York No Drawing. Application May 26, 1953
Serial No. 357,629

23 Claims. (Cl. 260—209)

This invention relates to thiosemicarbazone compounds and relates more particularly to thiosemicarbazones having therapeutic properties.

An object of this invention is the preparation of novel chemical compounds which are effective therapeutic agents for combatting Mycobacterium tuberculosis.

Other objects of this invention will appear from the following detailed description.

I have now found that chemotherapeutic agents having pronounced activity against Mycobacterium tuberculosis are obtained if a saccharide compound, particularly a polysaccharide compound having alpha-glycol groupings, is oxidized to yield a modified saccharide compound containing available, reactive carbonyl functions and the resulting modified saccharide compound then reacted with thiosemicarbazide or an amino-aryl-thiosemicarbazone such as p-aminobenzaldehyde thiosemicarbazone. In the case of oxidized starch, for example, the reaction product which is obtained by reacting the oxidized starch with thiosemicarbazide or the thiosemicarbazone of p-aminobenzaldehyde, for example, contains not more than one thiosemicarbazide or thiosemicarbazone molecule and one molecule of water for every hexose residue. Although the structure of these novel products has not as yet been completely established, they appear to be cyclic compounds wherein a heterocyclic ring is formed containing both oxygen and nitrogen. Ring closure is believed to be effected by addition of amino hydrogen to the carbonyl function to form a hydroxy group. In addition to the preparation of my novel compounds from a modified polysaccharide, such as starch, modified inulin or even cellulose may be employed. The periodate oxidation of monosaccharides and of oligosaccharides such as di-, tri-, tetra-, penta- and hexa-saccharides also yields compounds containing an available carbonyl function and theoretically capable of forming novel and valuable products when reacted with thiosemicarbazide, or other compound having a free amino group capable of such additive reaction. Furthermore, the periodate oxidation of polyuronides such as pectic acid and aliginic acid, which compounds are also polysaccharides, also yields intermediates which contain a carbonyl function and which react, as described, with thiosemicarbazide or with aminoarylthiosemicarbazones to form valuable therapeutic compounds.

Valuable therapeutic compounds are also obtained if said modified polysaccharides containing available carbonyl groups are reacted with a mixture of thiosemicarbazide and isoniazid, or a mixture of isoniazid and an amino-aryl-thiosemicarbazone so that the product obtained will contain the radical of each of said reactive amine compounds. Thus, for example, in the case of oxidized starch, the reaction of said oxidized starch with a mixture of isoniazid and p-aminobenzaldehyde thiosemicarbazone yields a product in which a portion of the available carbonyl groups react with the isoniazid moiety and the remainder with the reactive amino group of the p-aminobenzaldehyde thiosemicarbazone. The compound obtained may contain a varying ratio of isoniazid and p-aminobenzaldehyde thiosemicarbazone, depending upon the ratio of said reactants to each other in the mixture employed for reaction with the oxidized polysaccharide. The product obtained by reacting oxidized starch with a mixture of isoniazid and p-aminobenzaldehyde thiosemicarbazone has been found to be highly active as an anti-tubercular compound.

The oxidation of saccharide compounds whereby they are modified so that they will contain an available carbonyl function may be effected by means of the periodate ion utilizing periodic acid as the oxidizing agent or a periodate compound such as sodium meta periodate. The procedure is described in greater detail on pages 341 et seq. of "Organic Reactions," vol. II (1944), published by John Wiley & Sons, the starch oxidation being more particularly described on page 363.

The oxidation of starch, for example, yields a polymeric compound consisting of recurring units of the following structure:

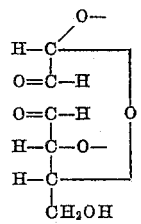

The polymeric compound thus obtained is bifunctional and is believed to react with a reactive primary amine group to yield a polymeric heterocyclic seven-membered ring compound having the following recurring structural units:

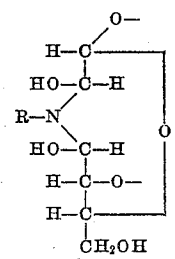

wherein R is the radical or nucleus to which the reactive primary amine group is attached.

Thus, in order to form the novel reaction products of my invention, the oxidized polysaccharide, such as starch for example, is dissolved in water by boiling and, while hot, thiosemicarbazide, or other reactive amine, is added to the oxidized starch solution. Upon the addition of the thiosemicarbazide, a reaction product is formed as indicated by the immediate milky appearance of the solution. The novel starch compound of my invention precipitates from the solution as a white, colloidal precipitate. The compound thus obtained, which contains about one equivalent of thiosemicarbazide for each hexose residue may be represented by the empirical formula $C_7H_{13}N_3O_5S$. The starch molecule, of course, contains a large but undetermined number of hexose residues. The amorphous nature of starch is indicated by its very high molecular weight and this is equally true in the case of the polysaccharide compounds of thiosemicarbazide, etc.

In order further to illustrate my invention, but without being limited thereto, the following examples are given:

*Example I*

4.5 grams of potato starch are treated in the cold with an aqueous solution of 6.18 grams of $NaIO_4$ in 200 cc. of water for 48 hours. The treated starch is filtered off and washed with water until the filtrate gives no color with starch, potassium iodide and sulfuric acid. The oxidized starch is then washed with hot alcohol, finally with ether and dried in a desiccator over concentrated sulfuric acid.

0.1 gram of oxidized starch are dissolved in 200 cc. of water by boiling for 10 minutes and, while hot, 1.25 grams of thiosemicarbazide are added. The solution becomes milky almost immediately and a white, colloidal precipitate settles on stirring. The white colloidal precipitate formed is filtered off on a sintered glass filter and washed with water, alcohol and finally with ether. The product is dried at 105° C. under vacuum to a perfectly white, amorphous powder. This powder is insoluble in water, alcohol and ether but is soluble in 1–2% sodium hydroxide to a faint yellow solution. The product has the empirical formula $C_7H_{13}N_3O_5S$ and analyzes as follows: Found: N=16.7, S=12.7; calculated: N=16.6, S=12.7.

*Example II*

2.4 parts by weight of p-aminobenzaldehyde thiosemicarbazone are dissolved in 750 parts by weight of hot water containing 10.5 parts by weight of glacial acetic acid. The clear solution is cooled to 35° C. and about 60 parts by weight of a 2% aqueous solution of oxidized starch are added. The reaction mixture obtained is stirred until the precipitate coagulates. The product formed is a pale orange powder insoluble in dilute acidic solution but soluble in cold, dilute ammonia. Analysis of the product yields the following: C=43.2%; H=5.7%; N=9.1%; and S=5.3%.

*Example III*

0.72 part by weight of p-aminobenzaldehyde thiosemicarbazone are dissolved in 750 parts by weight of water containing 10.5 parts by weight of glacial acetic acid. After cooling the solution, 0.51 part by weight of isoniazid are added and, following this last addition, 60 parts by weight of a 2% by weight aqueous solution of oxidized starch are added. The product formed separates from the reaction mixture and, after filtration and washing with hot ethanol, water, ethanol and ether, the product is dried. 1.6 parts by weight are obtained. The analysis of the product is: C=44.8%; H=5.5%; N=11.1%; and S=5.2%.

All of the above products show appreciable anti-tubercular activity.

It is understood that the foregoing detailed description is given merely by way of illustration and that many variations may be made therein without departing from the spirit of my invention.

Having described my invention, what I desire to secure by Letters Patent is:

1. Process for the production of therapeutic compounds, which comprises reacting an oxidized polysaccharide having at least two available carbonyl functions with a compound having a reactive primary amine group and selected from the group consisting of isoniazid, thiosemicarbazide and p-aminobenzaldehyde thiosemicarbazone.

2. Process for the production of therapeutic compounds, which comprises reacting an oxidized polysaccharide having at least two available carbonyl functions with a mixture of compounds each containing a reactive primary amine group and selected from the group consisting of isoniazid, thiosemicarbazide and p-aminobenzaldehyde thiosemicarbazone.

3. Process for the production of therapeutic compounds, which comprises reacting an oxidized polysaccharide having at least two available carbonyl functions with thiosemicarbazide.

4. Process for the production of therapeutic compounds, which comprises reacting an oxidized polysaccharide having at least two available carbonyl functions with p-aminobenzaldehyde thiosemicarbazone.

5. Process for the production of therapeutic compounds, which comprises reacting an oxidized polysaccharide having at least two available carbonyl functions with a mixture of thiosemicarbazide and isoniazid.

6. Process for the production of therapeutic compounds, which comprises reacting an oxidized polysaccharide having at least two available carbonyl functions with a mixture of p-aminobenzaldehyde thiosemicarbazone and isoniazid.

7. Process for the production of therapeutic compounds, which comprises reacting a modified starch oxidized with a periodate so as to contain at least two available carbonyl functions with a compound having a reactive primary amine group and selected from the group consisting of isoniazid, thiosemicarbazide and p-aminobenzaldehyde thiosemicarbazone.

8. Process for the production of therapeutic compounds, which comprises reacting a modified starch oxidized with a periodate so as to contain at least two available carbonyl functions with a mixture of compounds each containing a reactive primary amine group selected from the group consisting of isoniazid, thiosemicarbazide and p-aminobenzaldehyde thiosemicarbazone.

9. Process for the production of therapeutic compounds, which comprises reacting a modified starch oxidized with a periodate so as to contain at least two available carbonyl functions with thiosemicarbazide.

10. Process for the production of therapeutic compounds, which comprises reacting a modified starch oxidized with a periodate so as to contain at least two available carbonyl functions with p-aminobenzaldehyde thiosemicarbazone.

11. Process for the production of therapeutic compounds, which comprises reacting a modified starch oxidized with a periodate so as to contain at least two available carbonyl functions with a mixture of thiosemicarbazide and isoniazid.

12. Process for the production of therapeutic compounds, which comprises reacting a modified starch oxidized with a periodate so as to contain at least two available carbonyl functions with a mixture of p-aminobenzaldehyde thiosemicarbazone and isoniazid.

13. Process for the production of therapeutic compounds, which comprises reacting a modified alginic acid oxidized with a periodate so as to contain at least two available carbonyl functions with a compound having a reactive primary amine group selected from the group consisting of isoniazid, thiosemicarbazide and p-aminobenzaldehyde thiosemicarbazone.

14. Process for the production of therapeutic compounds, which comprises reacting a modified pectin oxidized with a periodate so as to contain at least two available carbonyl functions with a compound having a reactive primary amine group selected from the group consisting of isoniazid, thiosemicarbazide and p-aminobenzaldehyde thiosemicarbazone.

15. Process for the production of therapeutic compounds, which comprise reacting a modified inulin oxidized with a periodate so as to contain at least two available carbonyl functions with a compound having a reactive primary amine group selected from the group consisting of isoniazid, thiosemicarbazide and p-aminobenzaldehyde thiosemicarbazone.

16. Process for the production of therapeutic compounds, which comprise reacting a modified inulin oxidized with a periodate so as to contain at least two available carbonyl functions with p-aminobenzaldehyde thiosemicarbazone.

17. The product obtained in accordance with claim 7.
18. The product obtained in accordance with claim 10.
19. The product obtained in accordance with claim 11.
20. The product obtained in accordance with claim 13.
21. The product obtained in accordance with claim 14.
22. The product obtained in accordance with claim 16.
23. The product obtained in accordance with claim 12.

(References on following page)

References Cited in the file of this patent

UNITED STATES PATENTS

| | | |
|---|---|---|
| 2,355,911 | Graenacher et al. | Aug. 15, 1944 |
| 2,532,393 | Brink et al. | Dec. 5, 1950 |
| 2,552,547 | Fried et al. | May 15, 1951 |

FOREIGN PATENTS

| | | |
|---|---|---|
| 681,904 | Great Britain | Oct. 29, 1952 |

OTHER REFERENCES

Degering: "An Outline of Organic Nitrogen Compounds," published by University Lithoprinters (Ypsilanti, Michigan) 1945 (page 644 relied on).

Pigman et al.: "Chemistry of the Carbonhydrates," published by Academic Press (N. Y.) (pp. 210, 211 and 331 relied on).

Hopkins: Mfg. Chem., pages 361–4, September 1952.